US011016660B2

United States Patent
Gao

(10) Patent No.: US 11,016,660 B2
(45) Date of Patent: May 25, 2021

(54) METHOD AND APPARATUS FOR RESPONDING TO GESTURE OPERATION AND STORAGE MEDIUM

(71) Applicant: BEIJING XIAOMI MOBILE SOFTWARE CO., LTD., Beijing (CN)

(72) Inventor: Shang Gao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/822,089

(22) Filed: Mar. 18, 2020

(65) Prior Publication Data

US 2020/0310638 A1    Oct. 1, 2020

(30) Foreign Application Priority Data

Mar. 29, 2019  (CN) .......................... 201910248183.1

(51) Int. Cl.
*G06F 3/0488* (2013.01)
*G06F 1/16* (2006.01)
(Continued)

(52) U.S. Cl.
CPC ........ *G06F 3/04883* (2013.01); *G06F 1/1618* (2013.01); *G06F 1/1641* (2013.01);
(Continued)

(58) Field of Classification Search
CPC .. G06F 3/04883; G06F 1/1616; G06F 1/1618; G06F 1/1641; G06F 3/0482; G06F 3/04845
See application file for complete search history.

(56) References Cited

U.S. PATENT DOCUMENTS 9,489,078 B2 * 11/2016 Seo ........................ G06F 3/0488
2010/0182265 A1 * 7/2010 Kim ....................... G06F 1/1641
345/173
(Continued)

FOREIGN PATENT DOCUMENTS

EP           3 118 732 A1     1/2017
WO     WO 2018/048646 A1    3/2018

OTHER PUBLICATIONS

Extended European Search Report dated Sep. 25, 2020 in European Patent Application No. 20166498.4, 7 pages.

*Primary Examiner* — Namitha Pillai
(74) *Attorney, Agent, or Firm* — Oblon, McClelland, Maier & Neustadt, L.L.P.

(57) ABSTRACT

Provided is a method for responding to a gesture operation which is applied to a mobile terminal having folded display regions with n display areas, where n is a positive integer of not less than 2. The method can include determining, in response to a first touch operation detected in a first display area of the n display areas, whether a second touch operation is detected in a second display area within a target period. The second display area can be any of the n display areas other than the first display area. The method can further include determining, in response to the second touch operation detected in the second display area within the target period and touch positions of the two touch operations match each other, that a target gesture operation is detected, and enabling a first function corresponding to the target gesture operation.

12 Claims, 8 Drawing Sheets

(51) Int. Cl.
    *G06F 3/0482* (2013.01)
    *G06F 3/0484* (2013.01)

(52) U.S. Cl.
    CPC ........ *G06F 3/0482* (2013.01); *G06F 3/04845* (2013.01); *G06F 2203/04806* (2013.01)

(56) References Cited

U.S. PATENT DOCUMENTS

| | | |
|---|---|---|
| 2010/0188353 A1 | 7/2010 | Yoon et al. |
| 2012/0306782 A1* | 12/2012 | Seo ................. G06F 1/1647 345/173 |
| 2014/0375596 A1 | 12/2014 | Kim et al. |
| 2017/0351351 A1 | 12/2017 | Kim et al. |
| 2018/0356904 A1 | 12/2018 | Disano et al. |
| 2020/0225846 A1* | 7/2020 | Seo ................. G06F 1/1647 |

\* cited by examiner

METHOD AND APPARATUS FOR RESPONDING TO GESTURE OPERATION AND STORAGE MEDIUM

TECHNICAL FIELD

The present disclosure relates to the field of mobile terminal technology, and in particular to a method and apparatus for responding to a gesture operation and a storage medium.

BACKGROUND

With the rapid development of the display screen hardware technology, a foldable flexible display screen has now emerged and may be equipped in mobile terminals. When such flexible display screen of a mobile terminal is in a folded status, the space occupied by the terminal can be reduced, and when the flexible display screen is in an unfolded status, the terminal can provide a larger usable display area for the user. As such, the viewing effect of the user can be improved.

SUMMARY

The present disclosure provides a method and apparatus for responding to a gesture operation and a storage medium. According to a first aspect of the present disclosure, a method for responding to a gesture operation is provided, wherein the method can be applied to a mobile terminal having a display screen in a folded status that includes n display areas, where n is a positive integer of not less than 2. The method can include determining, in response to a first touch operation detected in a first display area of the n display areas, whether a second touch operation is detected in a second display area within a target period. The second display area can be any display area of the n display areas other than the first area. The method can further include determining, in response to the second touch operation detected in second display area within the target period and touch positions of the two touch operations match each other, that a target gesture operation is detected, and enabling, in response to the target gesture operation, a first function that corresponds to the target gesture operation.

According to a second aspect of the present disclosure, an apparatus for responding to a gesture operation is provided. The apparatus is applied to a mobile terminal having a display screen in a folded status that includes n display areas, where n is a positive integer of not less than 2. The apparatus can include a processor and a memory that is configured to store an instruction executable by the processor. The processor can be configured to determine, in response to a first touch operation detected in a first display area of the n display areas, whether a second touch operation is detected in a second display area within a target period. The second display area is any display area of the n display areas other than the first area. Further, the processor can be configured to determine, in response to the second touch operation detected in second display area within the target period and touch positions of the two touch operations match each other, that a target gesture operation is detected, and enable, in response to the target gesture operation, a first function that corresponds to the target gesture operation.

According to a third aspect of the present disclosure, a storage medium is provided, wherein a computer program instruction is stored in the storage medium and executed by a processor to implement a method for responding to the gesture operation. The method is applied to a mobile terminal having a display screen in a folded status that includes n display areas, where n is a positive integer of not less than 2. The method can include determining, in response to a first touch operation detected in a first display area of the n display areas, whether a second touch operation is detected in a second display area within a target period. The second display area is any display area of the n display areas other than the first area. The method can further include determining, in response to the second touch operation detected in second display area within the target period and touch positions of the two touch operations match each other, that a target gesture operation is detected, and snabling, in response to the target gesture operation, a first function that corresponds to the target gesture operation.

It is to be understood that both the foregoing general description and the following detailed description are exemplary and explanatory only, and are not intended to limit the present disclosure.

BRIEF DESCRIPTION OF THE DRAWINGS

The accompanying drawings, which are incorporated in and constitute a part of this specification, illustrate exemplary embodiments consistent with the present disclosure and, together with the specification, serve to explain the principles of the present disclosure.

DETAILED DESCRIPTION

Figure 1:
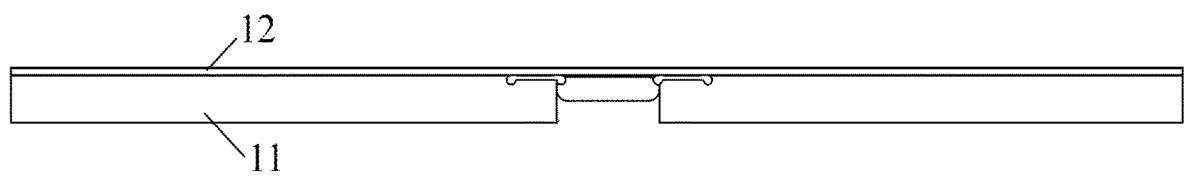
FIG. 1 is a schematic structural diagram of a mobile terminal according to an exemplary embodiment of the present disclosure.

Some embodiments will be described in detail herein, examples of which are illustrated by the accompanying drawings. The following description refers to the accompanying drawings in which the same numbers in different drawings represent the same or similar elements unless otherwise indicated. The implementations set forth in the following exemplary embodiments do not represent all implementations consistent with the present invention. Rather, they are merely examples of apparatuses and methods consistent with certain aspects of the present disclosure as detailed in the appended claims.

Before making a detailed explanation on the embodiments of the present disclosure, the structure of a mobile terminal is explained first. The mobile terminal may be a device, such as a mobile phone or a tablet computer, and is provided with a foldable display which is also referred to as a foldable display screen. The foldable display screen has a display function, as well as the characteristic of foldability. In the embodiments of the present disclosure, the foldable display screen can include at least two screen statuses which include a folded status and an unfolded status. When the foldable display screen is in the folded status, a space occupied by the terminal can be reduced, and when the foldable display screen is in the unfolded status, it can provide a larger usable display area for the user.

When the mobile terminal with flexible display screen is in a folded status, both the display screen facing front and the display screen facing back would have a display function and can sense a touch operation from the user. In this case, it is possible to provide a newly extended gesture operation for the mobile terminal to respond to, based on the new type of display screen, so that the user can use the mobile terminal more conveniently.

In the method provided by the exemplary embodiments of the present disclosure, when the mobile terminal is in a folded status, in response to a touch operation detected in any of the n display areas, the mobile terminal will enter a waiting status and determine whether another touch operation would be detected in any other display area within a target period. If another touch operation is detected and the touch positions of the two touch operations match each other, the mobile terminal determines that a newly extended gesture operation is detected. In response to this gesture operation, the mobile terminal would enable a function that corresponds to the gesture operation. That is, in the embodiments of the present disclosure, a newly extended gesture operation is provided for foldable mobile terminals. As such, not only great convenience is brought for the user to utilize the mobile terminal, but also functions of the mobile terminal are enriched, thereby achieving an excellent effect.

In the embodiments of the present disclosure, the display screen of the mobile terminal includes n display areas, and n is a positive integer of not less than 2. As an example, the value of n may be 2. That is, the foldable display screen includes two foldable display areas.

In this case, the display screen may be designed as a left-right foldable display screen or an up-down foldable display screen, or may be designed as an outward foldable display screen or an inward foldable display screen, which is not specifically limited in the embodiment of the present disclosure. Instructions on the structure are made by taking the display screen of the mobile terminal as the left-right foldable display screen as an example.

FIG. 1 is a schematic structural diagram of a mobile terminal in accordance with an exemplary embodiment of the present disclosure. Referring to FIG. 1, the mobile terminal includes a housing 11 and a display screen 12. One side of the display screen 12 is attached to the housing 11 and the other side is configured for display. The housing 11 is a foldable housing.

In a possible implementation, a rotating shaft is disposed in the middle of the housing 11. The housing on either side is rotatable about the rotating shaft to control the housing 11 to be folded or unfolded and to drive the display screen 12 to be folded or unfolded.

Figure 2:
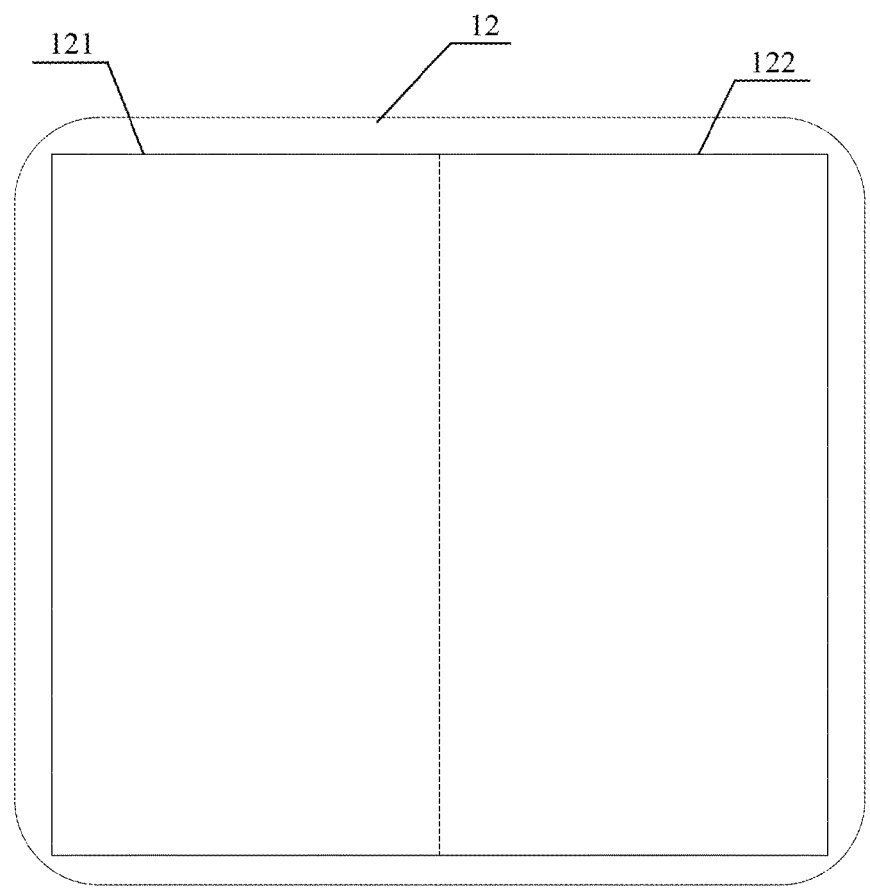
FIG. 2 is a schematic structural diagram of another mobile terminal according to an exemplary embodiment of the present disclosure.

In a possible implementation, the display screen 12, which may be a one-piece flexible display screen made of a flexible material, such as plastic, a metal foil, or other materials, is a bendable and deformable display component that can be unfolded or folded as the housing 11. As shown in FIG. 2, the display screen 12, which is a one-piece flexible display screen, can be divided into a first display area 121 and a second display area 122, and the two areas may have the same size, or have different sizes, which is not specifically limited in the embodiment of the present disclosure.

Figure 3:
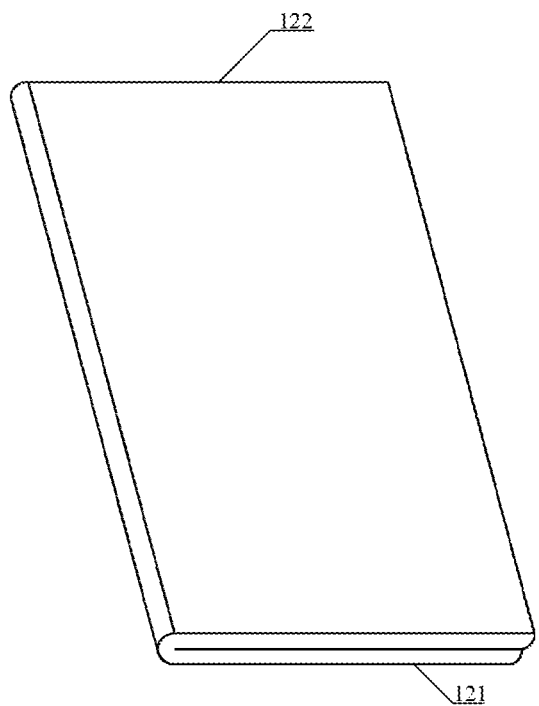
FIG. 3 is a schematic structural diagram of yet another mobile terminal according to an exemplary embodiment of the present disclosure.

As an example, referring to FIG. 3, the first display area 121 and the second display area 122 are the same size. When the display screen 12 is in the folded status, one display area is on top (i.e., facing the user), and the other display area is at bottom (i.e., facing away from the user). That is, in the folded status, the first display area 121 and the second display area 122 are parallel to each other with the front sides of the two display areas being in opposite directions. Here, the front side means a side for displaying a user interface.

Similarly, as shown in FIG. 2, the unfolded status refers to a status in which the first display area 121 and the second display area 122 are unfolded into the same plane, with the front sides of the two display areas being in the same direction.

Figure 4:
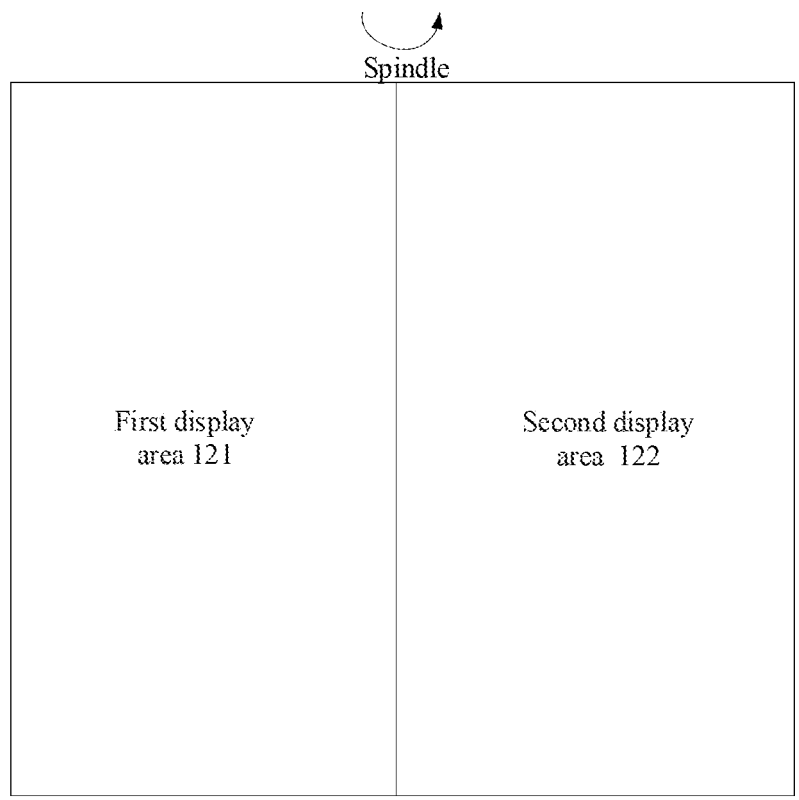
FIG. 4 is a schematic structural diagram of yet another mobile terminal according to an exemplary embodiment of the present disclosure.

In a possible implementation, as shown in FIG. 4, the display screen 12 may be folded outwards. Functional modules such as a camera and a flashlight can be disposed in the second display area 122 depending on the folding direction, which is not specifically limited in the embodiment of the present disclosure.

As another example, the value of n may be 3. That is, the foldable display screen may include three foldable display areas. In a possible implementation, the three display areas include one main screen and two auxiliary screens. In this case, the display screen of the mobile terminal may be designed as a left-right foldable display screen or an up-down foldable display screen, or may be designed as an outward foldable display screen or an inward foldable display screen, which is not specifically limited in the embodiment of the present disclosure.

Figure 5:
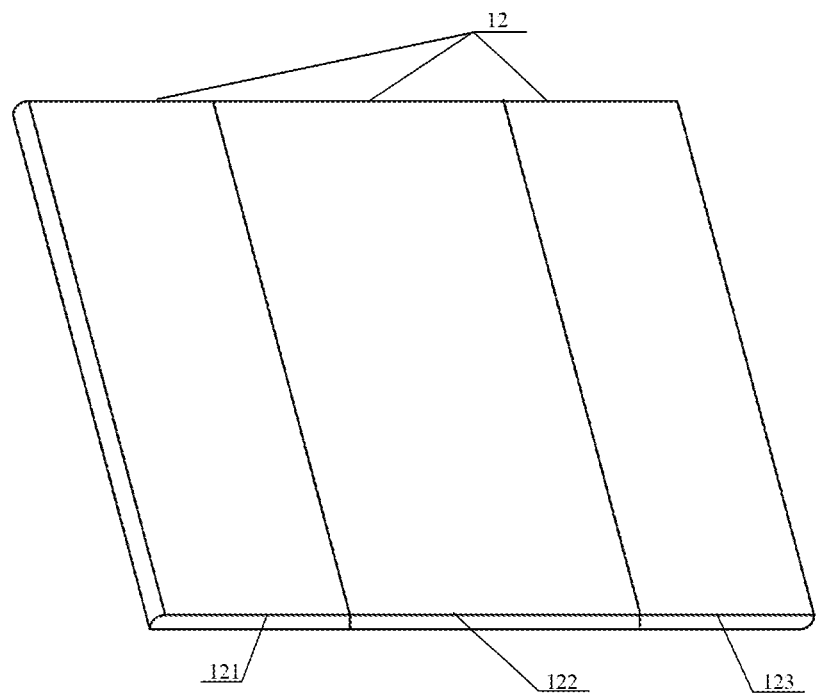
FIG. 5 is a schematic structural diagram of yet another mobile terminal according to an exemplary embodiment of the present disclosure.

Taking the display screen of the mobile terminal being designed as a left-right foldable display screen as a first example, as shown in FIG. 5, the display screen 12, which is a one-piece flexible display screen, can be divided into three display areas, namely one main screen 121, a first auxiliary screen 122 and a second auxiliary screen 123. In this case, the screen statuses include a folded status, an unfolded status, and a semi-unfolded status. That is, the display screen 12 may be in any one of the folded status, the unfolded status, and the semi-unfolded status.

Figure 6:
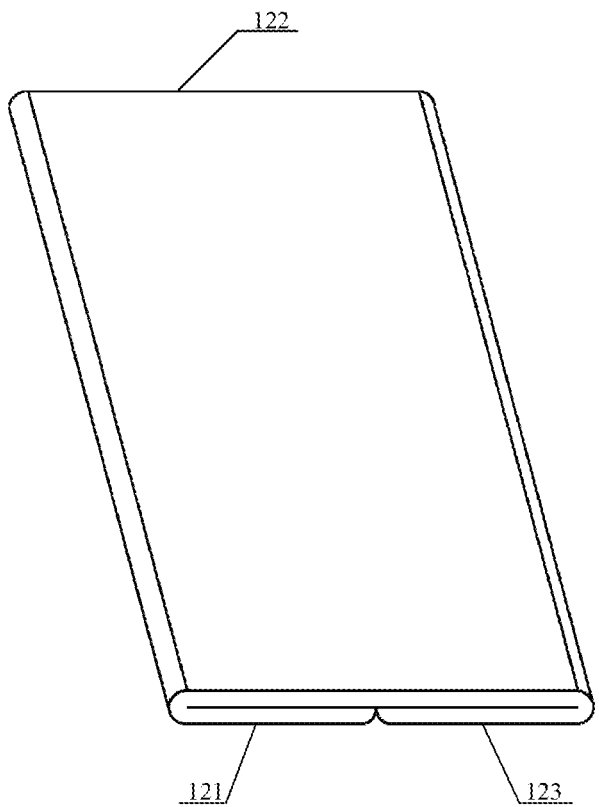
FIG. 6 is a schematic structural diagram of yet another mobile terminal according to an exemplary embodiment of the present disclosure.

For example, as shown in FIG. 6, in the folded status, the main screen 121, the first auxiliary screen 122 and the second auxiliary screen 123 are all parallel, and the front sides of the first auxiliary screen 122 and the second auxiliary screen 123 are in opposite directions from that of the main screen 121.

In another example, as shown in FIG. 5, the unfolded status refers to a status in which the main screen 121, the first auxiliary screen 122, and the second auxiliary screen 123 are on the same plane, and the front sides of the first auxiliary screen 122 and the second auxiliary screen 123 are in the same direction as that of the main screen 121.

Figure 7:
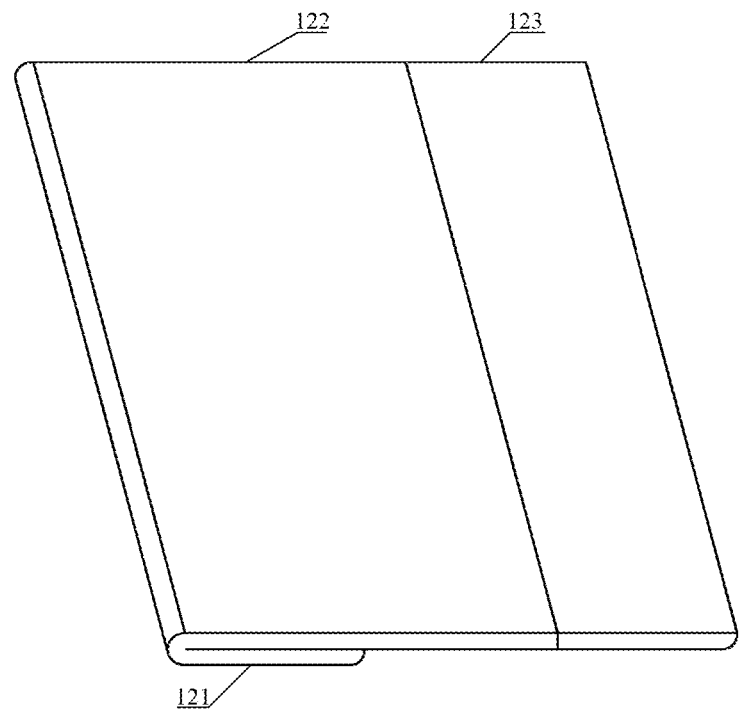
FIG. 7 is a schematic structural diagram of yet another mobile terminal according to an exemplary embodiment of the present disclosure.

In yet another example, as shown in FIG. 7, the semi-unfolded status refers to a status between the folded status and the unfolded status, that is, one of the two auxiliary screens is in an unfolded status while the other auxiliary screen is in a folded status. At this time, the main screen 121 is on the same plane as one of the auxiliary screens (such as the first auxiliary screen 122 or the second auxiliary screen 123), the front side of the main screen 121 is in the same direction as that of this auxiliary screen, and the front side of the main screen 121 is in an opposite direction from that of the other auxiliary screen.

Figure 8:
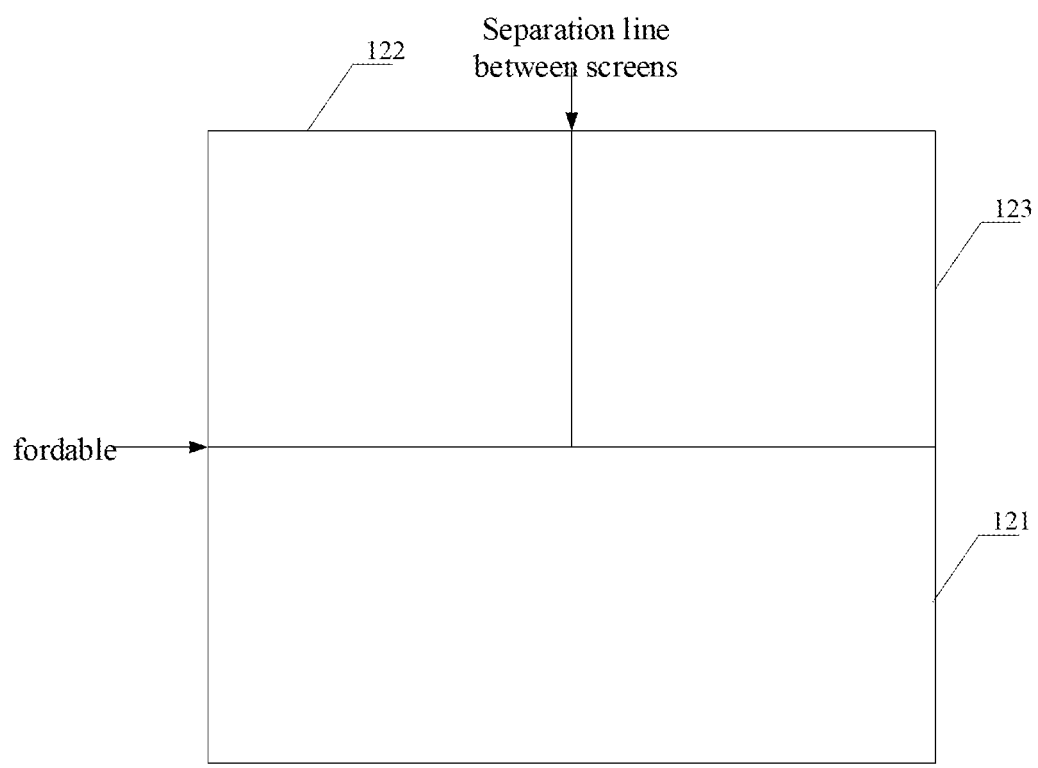
FIG. 8 is a schematic structural diagram of yet another mobile terminal according to an exemplary embodiment of the present disclosure.

Taking the display screen of the mobile terminal being designed as an up-down foldable display screen as a second example. FIG. 8 is a schematic structural diagram of another mobile terminal in an unfolded status. As shown in FIG. 8, the display screen 12 includes a main screen 121, a first auxiliary screen 122, and a second auxiliary screen 123 which may also be referred to as a first display area, a second display area, and a third display area respectively.

In a possible implementation, the three display areas described above may be an integrated structure. That is, the first display area, the second display area, and the third display area may be obtained by dividing one entire display screen into areas. In this case, in the folded status, both of the second display area and the third display area may be attached to the first display area.

In another possible implementation, the second display area and the third display area may be separate structures. In this case, it can be select to only make the second display area or the third display area contact the first display area.

The size of the first display area can be equal to the sum of the size of the second display area and the size of the third display area. When the display screen 12 is in the folded status, the first display area may face upward (i.e., facing the user), while the second display area and the third display area may face downward (i.e., backing onto the user), which is not specifically limited in the embodiment of the present disclosure.

Of course, it should be noted that the display screen of the mobile terminal may also be divided into more display areas in a similar way as described above, which is not specifically limited in the embodiment of the present disclosure.

Figure 9:
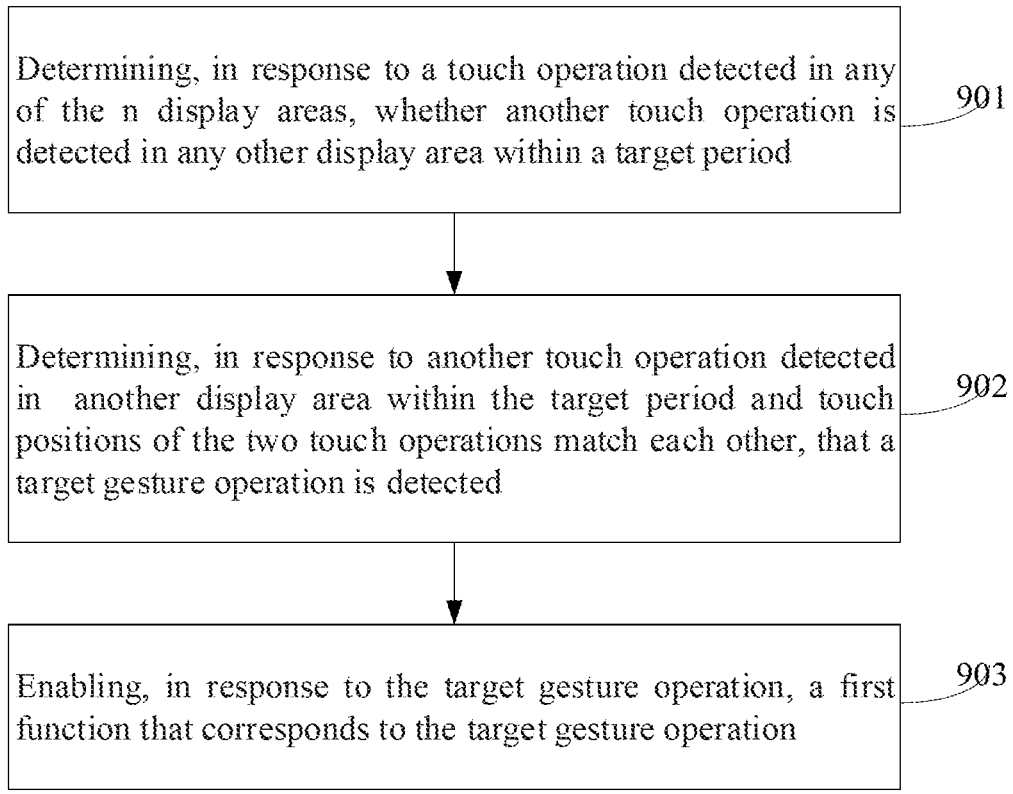
FIG. 9 is a flowchart of a method for responding to a gesture operation according to an exemplary embodiment of the present disclosure.

FIG. 9 is a flowchart of a method for responding to a gesture operation in accordance with an exemplary embodiment of the present disclosure. As shown in FIG. 9, the method is applied to a mobile terminal. A display region of the mobile terminal is in a folded status and includes n display areas, where n is a positive integer of not less than 2. The method can include the following steps.

Step 901 includes determining, in response to a touch operation detected in any one of the n display areas, whether another touch operation is detected in any other display area within a target period.

Step 902 includes determining, in response to another touch operation detected in another display area within the target period and touch positions of the two touch operations match each other, that a target gesture operation is detected.

Step 903 includes enabling, in response to the target gesture operation, a first function that corresponds to the target gesture operation.

In the method provided by the embodiment of the present disclosure, while the mobile terminal is in a folded status, in response to a touch operation detected in any of the n display areas, the mobile terminal will enter a waiting status and determine whether another touch operation is detected in any other display area within a target period. If another touch operation is detected and the touch positions of the two touch operations match each other, the mobile terminal determines that a newly extended gesture operation is detected, and in response to this gesture operation, the mobile terminal would enable a function that corresponds to the gesture operation. That is, in the embodiments of the present disclosure, a newly extended gesture operation is provided for foldable mobile terminals. As such, not only great convenience is brought for the user to utilize the mobile terminal, but also functions of the mobile terminal are enriched, thereby achieving an excellent effect.

In a possible implementation, the determining, in response to that another touch operation is detected in another display area within the target period and touch positions of the two touch operations match each other, that a target gesture operation is detected can further include determining, in response to that another touch operation is detected in another display area within the target period and a difference between the touch positions of the two touch operations is within a target pixel range, that the target gesture operation is detected.

In a possible implementation, the target gesture operation is configured to simulate a double-click operation. Further, the enabling, in response to the target gesture operation, a first function that corresponds to the target gesture operation can include: returning, in response to the target gesture operation, to the top of a currently displayed App interface; lightening, in response to the target gesture operation, at least one of the n display areas; opening, in response to the target gesture operation, a multimedia object targeted by the two touch operations; or zooming, in response to the target gesture operation, a multimedia object targeted by the two touch operations.

In a possible implementation, the target gesture operation is configured to simulate a press operation of which a press duration is more than a target threshold. Further, the enabling, in response to the target gesture operation, a first function that corresponds to the target gesture operation can include setting, in response to the target gesture operation, a multimedia object targeted by the two touch operations in a selected status; displaying, in response to the target gesture operation, at least one function option of a multimedia object targeted by the two touch operations; or displaying, in response to the target gesture operation, a management page of a multimedia object targeted by the two touch operations, wherein the management page at least includes an application management page, a notification management page or a setting management page.

In a possible implementation, the method further can further include enabling, in response to the touch operation and that no touch operation is detected in any other display area within the target period, a second function that corresponds to the touch operation.

Of course, it should be understood that all of the above-mentioned possible implementations can be combined in any way to form optional embodiments of the present disclosure, which are not repeated herein.

Figure 10:
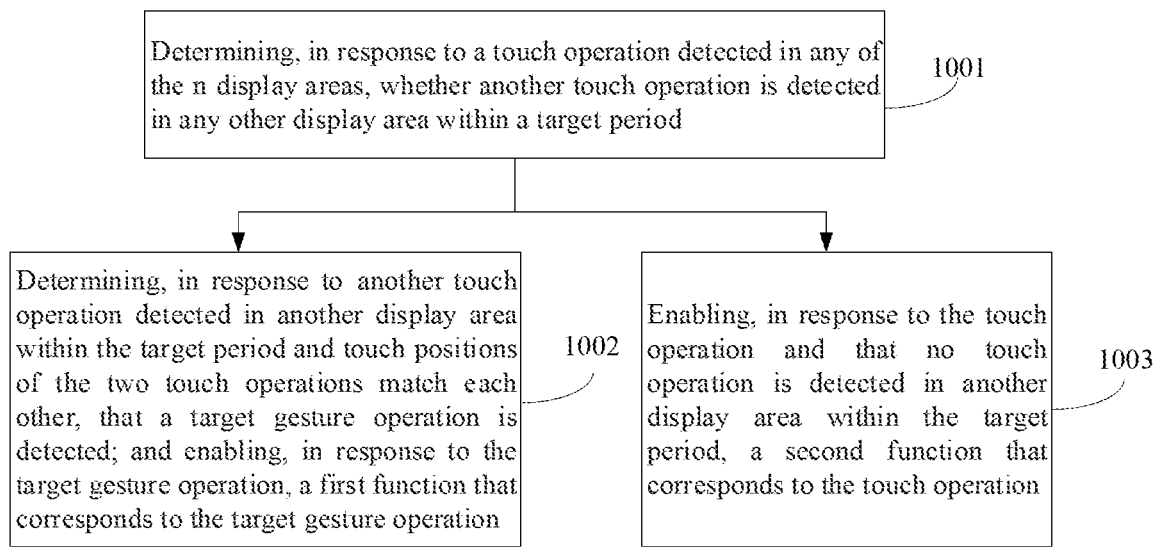
FIG. 10 is a flowchart of a method for responding to a gesture operation according to an exemplary embodiment of the present disclosure.

FIG. 10 is a flowchart of a method for responding to a gesture operation in accordance with an exemplary embodiment of the present disclosure. As shown in FIG. 10, the method is applied to a mobile terminal. A display screen of the mobile terminal is in a folded status and includes n display areas, where n is a positive integer of not less than 2. The method includes the following steps.

Step 1001 including determining, in response to a touch operation detected in any one of the n display areas, whether another touch operation is detected in any other display area within a target period. Currently, screen touch gestures generally include a click operation, a slide operation, a long-press operation and a double-click operation in categories. By executing the above-mentioned touch gestures on a display screen, a user may trigger the mobile terminal to enable corresponding set functions.

In the above-mentioned touch gestures, the click operation and the slide operation are very quickly responded operation modes. The click operation is usually used to confirm a certain function. The slide operation is usually used to drag, browse, and turn pages. The long-press operation and the double-click operation belong to delayed operations. The long-press operation can only trigger the function until a user pressing the button for a period of time (e.g., 0.5 s). The double-click operation relies on a delayed response (e.g., 0.3 s) of single clicks. That is, only two single clicks with a time interval of no more than 0.3 s would be recognized as a double-click operation. Therefore, the long-press operation and the double-click operation are often used for advanced operations in an App.

In some embodiments of the present disclosure, as the display screen on the mobile terminal is foldable, and in a folded status, the side of the terminal facing the user and the other side facing away from the user are both display areas which can display and sense touch operations from the user, the new gesture operations as developed based on this characteristic can assist the user in using the mobile terminal more conveniently.

Here, the new gesture operation may be used to simulate the above-mentioned screen touch gestures, and may also be other new custom operations, which is not specifically limited in the embodiment of the present disclosure.

In a possible implementation, considering that in the screen touch gestures mentioned above, the click operation and the slide operation are already habitual operations of the user and not suitable for adjustment, and the long-press operation and double-click operation require long time for triggering functions, are relatively complicated in operation, and thus belong to slow and inconvenient operation modes, as such, it is desired to extend new gesture operations for the foldable mobile terminal to simulate the long-press operation or the double-click operation. To put it another way, the embodiments of the present disclosure aims to provide new gesture operations that can be applied to a foldable mobile terminal to improve the user experience upon using the mobile terminal.

The target period may be 50 ms, which is not specifically limited in the embodiment of the present disclosure. The "any other display area" is any one of the (n−1) display areas, that is, the display area in which the touch operation is detected is excluded.

In the present embodiment, when the mobile terminal is in the folded status and a touch operation is made on any one of the n display areas, that is, there is a touch operation on a front screen or a rear screen, the mobile terminal will be in a waiting status for a waiting period (i.e., the above target period), so as to determine whether the gesture operation currently performed by the user is a newly extended gesture operation.

Here, the above touch operation may refer to a click operation, which is not specifically limited in the embodiment of the present disclosure.

Step 1002 includes determining, in response to another touch operation detected in any other display area within the target period and touch positions of the two touch operations match each other, that a target gesture operation is detected, and enabling, in response to the target gesture operation, a first function that corresponds to the target gesture operation.

In an example, a "pick gesture" is used to represent the new gesture operation (also referred to as a target gesture operation herein). In certain embodiment of the present disclosure, the pick gesture is defined as two touch operations at same or close positions of front and rear screens of a terminal in a folded status, within a target period.

In a possible implementation, by the expression "touch positions of the two touch operations match each other", it means that a difference between the touch positions of the two touch operations is within the target pixel range. That is, in response to another touch operation detected in another display area within the target period and the difference between the touch positions of the two touch operations is within the target pixel range, the mobile terminal determines that the target gesture operation is detected.

Here, the target pixel range may be a 50*50 pixel range, which is not specifically limited in the embodiment of the present disclosure. For example, after detecting a click operation in the display area on one side, the mobile terminal enters the waiting status and waits for 50 ms. If a click operation is detected again in the display area, not exceeding the 50*50 pixel range, on the other side within 50 ms, it is determined that the pick gesture is, authenticated and the function that corresponds to the pick gesture is enabled. That is, the mobile terminal is triggered to perform an operation that corresponds to the pick gesture.

In a possible implementation, the pick gesture can directly trigger a function equivalent to the double-click operation. That is, the pick gesture can be configured to simulate the double-click operation. Correspondingly, the mobile terminal responds to the pick gesture and enables a first function corresponding to the pick gesture in a manner which includes but is not limited to the following manners.

In a first manner; in response to the target gesture operation, the function of returning to the top of a currently displayed application interface is enabled. With respect to this advanced operation in an App, exemplarily, when the user continuously pages down on an application interface for content browsing, by performing a pick gesture on the status bar, the mobile terminal can be triggered to quickly return to the top of the currently displayed application interface, thereby replacing the action of double-clicking the status for returning to the top of the interface.

In a second manner, in response to the target gesture operation, the function of lightening at least one of the n display areas is enabled. Here, the pick gesture may result in that only the display area on the side facing the user is lightened, or only the display area on the side facing away from the user is lightened, or the display areas on both sides are lightened at the same time, which is not specifically limited in the embodiment of the present disclosure and can be preset by the user on his/her own will.

In a third manner, in response to the target gesture operation, the function of opening a multimedia object targeted by the two touch operations is enabled. Here, the opened multimedia object includes but is not limited to a document, a picture, audio, and video, which is not specifically limited in the embodiment of the present disclosure.

In a fourth manner, in response to the target gesture operation, the function of zooming a multimedia object targeted by the two touch operations is enabled. A zoom operation includes a zoom-in operation and a zoom-out operation. At this time, the multimedia object usually refers to a picture.

In another possible implementation, the pick gesture can also directly trigger a function equivalent to the long-press operation. That is, the pick gesture can be configured to simulate a press operation of which a press duration is more than a target threshold (e.g., 0.5 s), namely, the long-press operation. Correspondingly, the mobile terminal responds to the pick gesture and enables the first function corresponding to the target gesture operation in a manner which includes but is not limited to the following manners.

In a first manner, in response to the target gesture operation, the function of setting a multimedia object targeted by the two touch operations in a selected status is enabled. For example, before dragging a multimedia object, the user usually needs to set it into a selected status. It can usually be necessary to perform a long-press operation on the multimedia object to set it into a selected status. However, in the present embodiment, the pick gesture replaces the long-press operation. That is, if the two touch operations are directed to the same multimedia object, the multimedia object is set into a selected status, such that the user can conveniently perform subsequent operations such as dragging.

In a second manner, in response to the target gesture operation, the function of displaying at least one function option of a multimedia object targeted by the two touch operations is enabled.

In different application scenarios or for different multimedia objects, the types of the function options are also different. For example, for a text displayed in an App, the corresponding function options may include copying, sending to a friend, collecting as a favorite, adding a reminder, deleting, and the like, which is not specifically limited in the embodiment of the present disclosure.

In a third manner, in response to the target gesture operation, the function of displaying a management page of a multimedia object targeted by the two touch operations is enabled. Here, different types of multimedia objects may have different types of displayed management pages. For example, if the multimedia object targeted by the two touch operations is an application icon, the displayed management page may be an application management page; if the multimedia object targeted by the two touch operations is a notification message, the displayed management page may be a notification management page; and if the multimedia object targeted by the two touch operations is a setting option such as hotspot or Bluetooth, the displayed management page may be a setting management page.

It should be noted that the pick gesture can respond to other user-defined functions in addition to the functions described above, which is not specifically limited in the embodiment of the present disclosure.

Step 1003 includes enabling, in response to the touch operation and that no touch operation is detected in any other display area within the target period, a second function that corresponds to the touch operation.

In the embodiments of the present disclosure, if no touch operation is detected in any other display area within the target period, it is confirmed that the user only performs touch operation currently, rather than a pick gesture, in the display area on one side. Therefore, the mobile terminal responds to the touch operation and enables the second function that corresponds to the touch operation. The second function includes, hut is not limited to, confirming that a certain operation is performed, which is not specifically limited in the embodiment of the present disclosure.

In the method provided by the embodiment of the present disclosure, when the mobile terminal is in a folded status, in response to a touch operation detected in any of the n display areas, the mobile terminal will enter a waiting status and determine whether another touch operation would be detected in any other display area within a target period. If another touch operation is detected and the touch positions of the two touch operations match each other, the mobile terminal determines that a newly extended gesture operation is detected, and in response to this gesture operation, the mobile terminal would enable a function that corresponds to the gesture operation. That is, in the embodiments of the present disclosure, a newly extended gesture operation is provided for foldable mobile terminals. As such, not only great convenience is brought for the user to utilize the mobile terminal, but also functions of the mobile terminal are enriched, thereby achieving an excellent effect.

Figure 11:
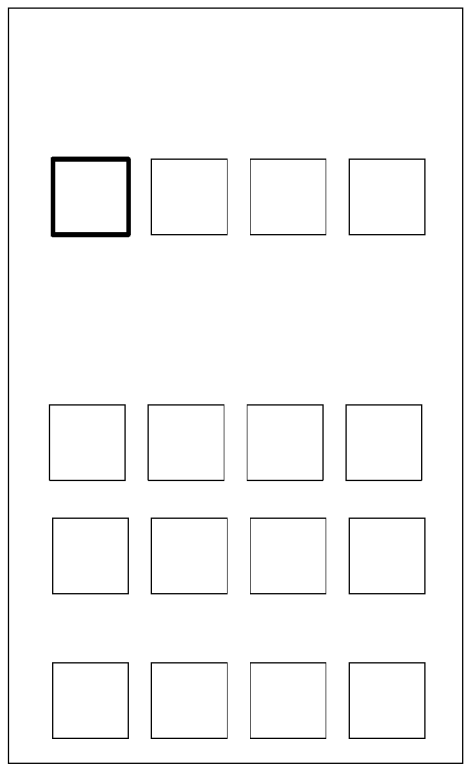
FIG. 11 is a schematic display diagram of a mobile terminal according to an exemplary embodiment of the present disclosure.
Figure 12:
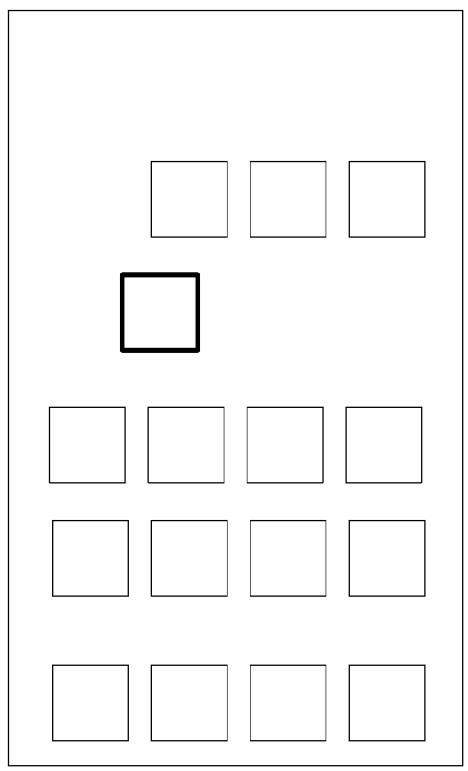
FIG. 12 is a schematic display diagram of a mobile terminal according to an exemplary embodiment of the present disclosure.

In another embodiment, referring to FIGS. 11 and 12, a desktop scenario is taken as an example below. In this case, a pick gesture is used to function as a long-press operation, and the mobile terminal makes a response to the pick gesture in the following ways.

Regarding, the desktop scenario, application icons could edited in the following way: if a user needs to move an application icon, then he has to lone-press the application ion to select it, such that the application icon enters a dragging status and then the user can drag it. When the user wants to modify the overall desktop layout, display positions of a plurality of application icons need to be changed. At this time, it would take the user a long time to select each application icon by the long-press operation.

However, after using the pick gesture, the user can simultaneously press, with two fingers, at the same or close positions on both the front screen and the rear screen, such that the application ions at the corresponding positions can directly enter the dragging status to be selected. This gesture operation brings much convenience for the user to quickly move the application icons. As such, the user can also implement other custom operations based on the pick gesture, which is not specifically limited in the embodiment of the present disclosure.

In summary, in the present embodiments, a new gesture operation is extended to trigger a certain operation more quickly and easily, which significantly improves the user experience.

Figure 13:
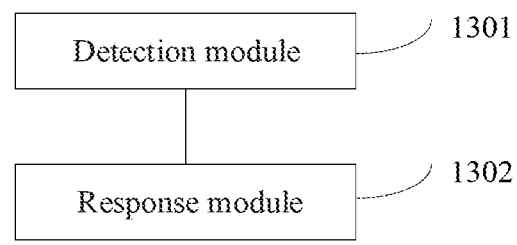
FIG. 13 is a block diagram of an apparatus for responding to a gesture operation according to an exemplary embodiment of the present disclosure.

FIG. 13 is a block diagram of an apparatus for responding to a gesture operation in accordance with an exemplary embodiment of the present disclosure. The apparatus is applied to a mobile terminal. A display screen of the mobile terminal is in a folded status and includes n display areas, where n is a positive integer of not less than 2. Referring to FIG. 13, the apparatus includes a detection module 1301 and a response module 1302.

The detection module 1301 is configured to determine, in response to a touch operation detected in any one of the n display areas, whether another touch operation is detected in any other display area within a target period.

The response module 1302 is configured to determine, in response to another touch operation detected in another display area within the target period and touch positions of the two touch operations match each other, that a target gesture operation is detected, and to enable, in response to the target gesture operation, a first function that corresponds to the target gesture operation.

In the method provided by the embodiment of the present disclosure, when the mobile terminal is in a folded status, in response to a touch operation detected in any of the n display areas, the mobile terminal will enter a waiting status and determine whether another touch operation would be detected in any other display area within a target period. If another touch operation is detected and the touch positions of the two touch operations match each other, the mobile terminal determines that a newly extended gesture operation is detected, and in response to this gesture operation, the mobile terminal would enable a function that corresponds to the gesture operation. That is, in the embodiments of the present disclosure, a newly extended gesture operation is provided for foldable mobile terminals. As such, not only great convenience is brought for the user to utilize the mobile terminal, but also functions of the mobile terminal are enriched, thereby achieving an excellent effect.

In a possible implementation, the response module 1302 is further configured to determine, in response to another touch operation detected in another display area within the target period and a difference between the touch positions of the two touch operations is within a target pixel range, that the target gesture operation is detected.

In a possible implementation, the response module 1302 is further configured to return, in response to the target gesture operation, to the top of a currently displayed App interface; lighten, in response to the target gesture operation, at least one of the n display areas; open, in response to the target gesture operation, a multimedia object targeted by the two touch operations; or zoom, in response to the target gesture operation, a multimedia object targeted by the two touch operations.

In a possible implementation, the response module 1302 is further configured to place, in response to the target gesture operation, a multimedia object targeted by the two touch operations in a selected status; display, in response to the target gesture operation, at least one function option of a multimedia object targeted by the two touch operations; display, in response to the target gesture operation, a management page of a multimedia object targeted by the two touch operations, wherein the management page at least includes an application management page, a notification management page or a setting management page.

In a possible implementation, the response module 1302 is further configured to enable, in response to the touch operation and that no touch operation is detected in any other display area within the target period, a second function that corresponds to the touch operation.

Of course, it should be understood that all the above-mentioned possible implementations can be combined in any way to form optional embodiments of the present disclosure, which are not repeated herein.

With regard to the apparatuses in the aforesaid embodiments, the specific implementations in which the respective modules perform the operations have been described in detail in the related method embodiments, and are not repeated herein.

Figure 14:
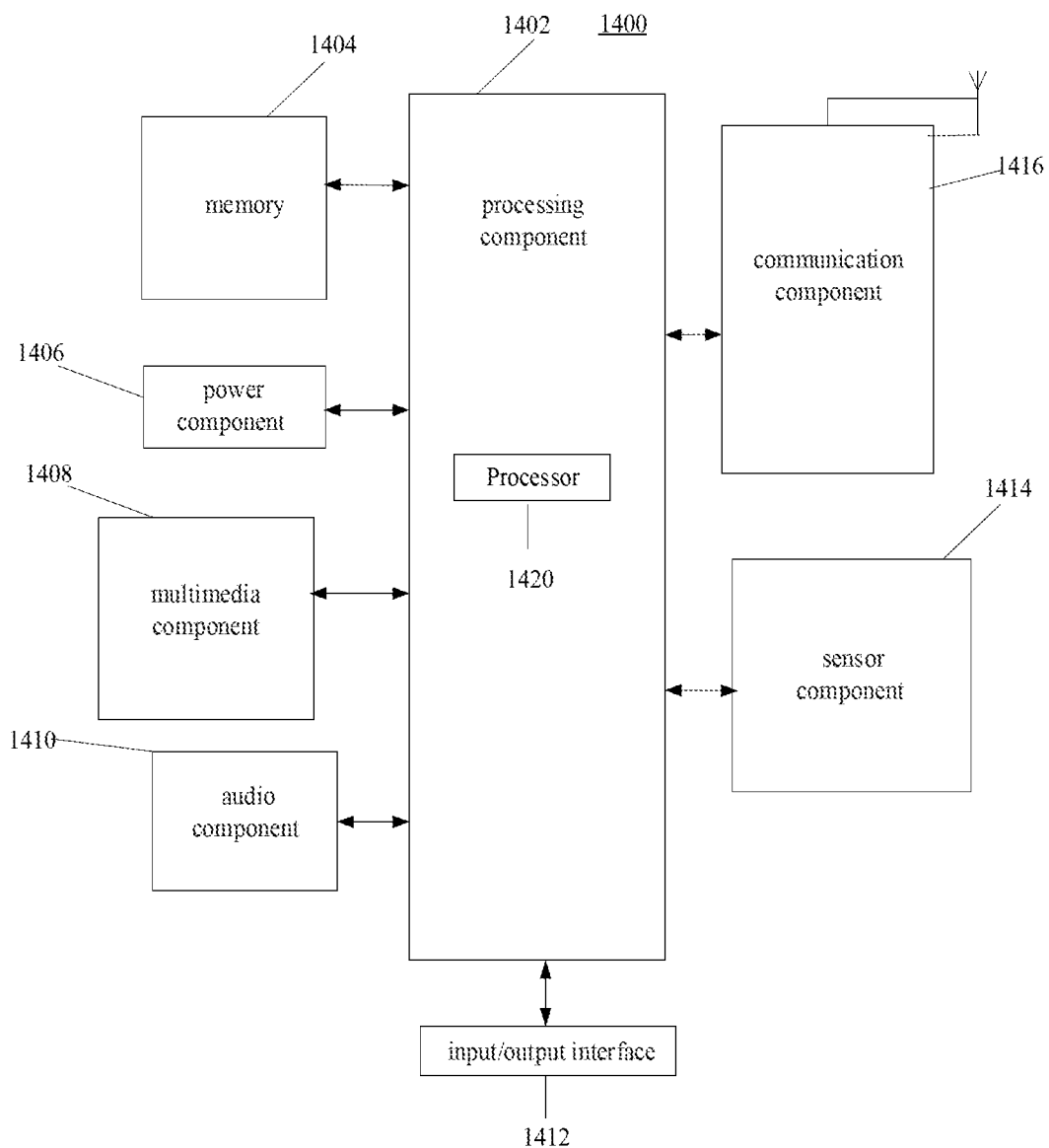
FIG. 14 is a block diagram of an apparatus for responding to a gesture operation according to an exemplary embodiment of the present disclosure.

FIG. 14 is a block diagram of an apparatus 1400 for responding to a gesture operation according to an embodiment of the present disclosure. For example, the apparatus 1400 may be a mobile phone, a computer, a digital broadcast terminal, a message transceiver device, a game console, a tablet device, a piece of medical equipment, a piece of fitness equipment, a personal digital assistant, and the like.

Referring to FIG. 14, the apparatus 1400 may include one or more of the following components: a processing component 1402, a memory 1404, a power component 1406, a multimedia component 1408, an audio component 1410, an input/output (I/O) interface 1412, a sensor component 1414, and a communication component 1416.

The processing component 1402 typically controls overall operations of the apparatus 1400, such as the operations associated with display, telephone calls, data communications, camera operations, and recording operations. The processing component 1402 may include one or more processors 1420 to execute instructions to perform all or part of the steps in the above described methods. Moreover, the processing component 1402 may include one or more modules which facilitate the interaction between the processing component. 1402 and other components. For instance, the processing component 1402 may include a multimedia module to facilitate the interaction between the multimedia component 1408 and the processing component 1402.

The memory 1404 is configured to store various types of data to support the operation of the apparatus 1400. Examples of such data include instructions for any applications or methods operated on the apparatus 1400, contact data, phonebook data, messages, pictures, video, etc. The memory 1404 may be implemented using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1406 provides power to various components of the apparatus 1400. The power component 1406 may include a power management system, one or more power sources, and any other components associated with the generation, management, and distribution of power in the apparatus 1400.

The multimedia component 1408 includes a screen providing an output interface between the apparatus 1400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 1408 includes a front camera and/or a rear camera. The front camera and/or the rear camera may receive an external multimedia datum while the apparatus 1400 is in an operation mode, such as a photographing mode or a video mode. Each of the front camera and the rear camera may be a fixed optical lens system or have focus and optical zoom capability.

The audio component 1410 is configured to output and/or input audio signals. For example, the audio component 1410 includes a microphone (MIC) configured to receive an external audio signal when the apparatus 1400 is in an operation mode, such as a call mode, a recording mode, and a voice recognition mode. The received audio signal may be further stored in the memory 1404 or transmitted via the communication component 1416. In some embodiments, the audio component 1410 further includes a speaker to output audio signals.

The I/O interface 1412 provides an interface between the processing component 1402 and peripheral interface modules, such as a keyboard, a click wheel, buttons, and the like. The buttons may include, but are not limited to, a home button, a volume button, a starting button, and a locking button.

The sensor component 1414 includes one or more sensors to provide status assessments of various aspects of the apparatus 1400. For instance, the sensor component 1414 may detect an open/closed status of the apparatus 1400, relative positioning of components, e.g., the display and the keypad, of the apparatus 1400, a change in position of the apparatus 1400 or a component of the apparatus 1400, a presence or absence of user contact with the apparatus 1400, an orientation or an acceleration/deceleration of the apparatus 1400, and a change in temperature of the apparatus 1400. The sensor component 1414 may include a proximity sensor configured to detect the presence of nearby objects without any physical contact. The sensor component 1414 may also include a light sensor, such as a complementary metal oxide semiconductor (CMOS) or charge-coupled device (CCD) image sensor, for use in imaging applications. In some embodiments, the sensor component 1414 may also include an accelerometer sensor, a gyroscope sensor, a magnetic sensor, a pressure sensor, or a temperature sensor.

The communication component 1416 is configured to facilitate communication, wiredly or wirelessly, between the apparatus 1400 and other devices. The apparatus 1400 can access a wireless network based on a communication standard, such as WiFi, 2G, or 3G, or a combination thereof. In an embodiment, the communication component 1416 receives a broadcast signal or broadcast associated information from an external broadcast management system via a broadcast channel. In an embodiment, the communication component 1416 further includes a near field communication (NFC) module to facilitate short-range communications.

In some embodiments, the apparatus 1400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components for executing the above methods for responding to gesture operations.

In some embodiments, there is also provided a non-temporary computer-readable storage medium including instructions, such as the memory 1404 including instructions. These instructions may be loaded and executed by the processor 1420 in the apparatus 1400 for executing the above methods. For example, the non-transitory computer readable storage medium may be a ROM, a random-access memory (RAM), a compact disc read-only memory (CD-ROM), a magnetic tape, a floppy disk, an optical data storage device, and the like.

There is also provided a non-temporary computer-readable storage medium. When the instructions in the storage medium are executed by a processor of a mobile terminal, the mobile terminal can be caused to execute the above methods for responding to gesture operations.

In some embodiments of the present disclosure, a method for responding to a gesture operation is provided, wherein the method is applied to a mobile terminal, display screen of the mobile terminal is in a folded status and includes n display areas, n is a positive integer of not less than 2. The method can include determining, when a touch operation detected in any one of the n display areas, whether another touch operation is detected in any other display area within a target period. The method can further include determining, when another touch operation is detected in another display area within the target period and touch positions of the two touch operations match each other, that a target gesture operation is detected, and enabling, in response to the target gesture operation, a first function that corresponds to the target gesture operation.

Optionally, the determining, when another touch operation is detected in another display area within the target period and touch positions of the two touch operations match each other, that a target gesture operation is detected can further include determining, when another touch operation is detected in another display area within the target period and a difference between the touch positions of the two touch operations is within a target pixel range, that the target gesture operation is detected.

Optionally, the target gesture operation is configured to simulate a double-click operation. Further, the enabling, in response to the target gesture operation, a first function that corresponds to the target gesture operation n can include: returning, in response to the target gesture operation, to the top of a currently displayed App interface; lightening, in response to the target gesture operation, at least one of the n display areas; opening, in response to the target gesture operation, a multimedia object targeted by the two touch operations; or zooming, in response to the target gesture operation, a multimedia object targeted by the two touch operations.

Optionally, the target gesture operation can be configured to simulate a press operation of which a press duration is more than a target threshold. Further, the enabling, in response to the target gesture operation, a first function that corresponds to the target gesture operation can include setting, in response to the target gesture operation, a multimedia object targeted by the two touch operations in a selected status; displaying, in response to the target gesture operation, at least one function option of a multimedia object targeted by the two touch operations; or displaying, in response to the target gesture operation, a management page of a multimedia object targeted by the two touch operations, wherein the management page at least includes an application management page, a notification management page or a setting management page.

Optionally, the method can further include enabling, in response to the touch operation and that no touch operation is detected in any other display area within the target period, a second function that corresponds to the touch operation.

In some embodiments of the present disclosure, an apparatus for responding to a gesture operation is provided, wherein the apparatus is applied to a mobile terminal, a display screen of the mobile terminal is in a folded status and includes n display areas, where n is a positive integer of not less than 2. The apparatus can include a detection module configured to determine, when a touch operation is detected in any one of the n display areas, whether another touch operation is detected in any other display area within a target period. The apparatus can further include a response module configured to determine, when another touch operation is detected in another display area within the target period and touch positions of the two touch operations match each other, that a target gesture operation is detected, and to enable, in response to the target gesture operation, a first function that corresponds to the target gesture operation.

Optionally, the response module can further be configured to determine, when the another touch operation is detected in another display area within the target period and a difference between the touch positions of the two touch operations is within a target pixel range, that the target gesture operation is detected.

Optionally, the response module can further be configured to return, in response to the target gesture operation, to the top of a currently displayed App interface; lighten, in response to the target gesture operation, at least one of the n display areas; open, in response to the target gesture operation, a multimedia object targeted by the two touch operations; or zoom, in response to the target gesture operation, a multimedia object targeted by the two touch operations.

Further, the response module can be configured to place, in response to the target gesture operation, a multimedia object targeted by the two touch operations in a selected status; display, in response to the target gesture operation, at least one function option of a multimedia object targeted by the two touch operations; or display, in response to the target gesture operation, a management page of a multimedia object targeted by the two touch operations, wherein the management page at least includes an application management page, a notification management page or a setting management page.

Additionally, the response module can be further configured to enable, in response to the touch operation and that no touch operation is detected in any other display area within the target period, a second function that corresponds to the touch operation.

In some embodiments of the present disclosure, an apparatus for responding to a gesture operation is provided, wherein the apparatus is applied to a mobile terminal, a display screen of the mobile terminal that is in a folded status and includes n display areas, where n is a positive integer of not less than 2. The apparatus can include a processor, and a memory configured to store an instruction executable by the processor. The processor can be configured to determine, when a touch operation is detected in any one of the n display areas, whether another touch operation is detected in any other display area within a target period. The processor can be further configure to determine, when another touch operation is detected in another display area within the target period and touch positions of the two touch operations match each other, that a target gesture operation is detected, and enable, in response to the target gesture operation, a first function that corresponds to the target gesture operation.

In some embodiments of the present disclosure, a storage medium is provided, wherein a computer program instruction is stored in the storage medium and executed by a processor to implement the method for responding to the gesture operation in the first aspect.

In the technical solutions provided by the embodiments of the present disclosure, in the folded status of a mobile terminal, when a touch operation is detected in any one of the n display areas, the mobile terminal will enter a waiting status and determine whether another touch operation is detected in any other display area within the target period. If another touch operation is detected and the touch positions of the two touch operations match each other, the mobile terminal determines that a newly extended gesture operation is detected, and in response to this gesture operation, enables the function that corresponds to the gesture operation. That is, in the embodiments of the present disclosure, a newly extended gesture operation is provided for foldable mobile terminals. As such, not only is much convenience provided for a user to use the mobile terminal, but also functions of the mobile terminal are enriched, and the effect is excellent.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure being indicated by the following claims.

It will be understood that the present disclosure is not limited to the exact constructions that have been described above and illustrated in the accompanying drawings, and that various modifications and changes can be made without departing from the scope thereof.

What is claimed is:

1. A method for responding to a gesture operation, wherein the method is applied to a mobile terminal having a display screen that is in a folded status and includes n display areas, where n is a positive integer not less than 2, the method comprising:
   determining, in response to a first touch operation detected in a first display area of the n display areas, whether a second touch operation is detected in a second display area of the n display areas within a target period, where the first display area and the second display area are different display areas;
   determining whether a target gesture operation is detected, in response to a second touch operation detected in the second display area within the target period, when touch positions of the two touch operations match each other; and
   enabling a first function that corresponds to the target gesture operation, when the target gesture operation is detected,
   wherein determining whether the target gesture operation is detected further includes determining that the target gesture operation is detected, in response to the second touch operation being detected in the second display area within the target period, when a difference between touch positions of the two touch operations is within a target pixel range, and
   wherein, in the folded status, the first and second display areas are arranged in a stacked form with the two display areas facing opposing directions, and a difference between the touch positions of the two touch operations indicates a distance between a touch position of the second touch operation and a projection of the first touch position onto the second display area.

2. The method according to claim 1, wherein the target gesture operation is configured to simulate a double-click operation and enabling the first function that corresponds to the target gesture operation includes at least one of:
   returning, in response to the target gesture operation, to the top of a currently displayed App interface;
   lightening, in response to the target gesture operation, at least one of the n display areas;
   opening, in response to the target gesture operation, a multimedia object targeted by the two touch operations; or
   zooming, in response to the target gesture operation, a multimedia object targeted by the two touch operations.

3. The method according to claim 1, wherein the target gesture operation is configured to simulate a press operation and enabling the first function that corresponds to the target gesture operation includes at least one of:
  setting, in response to the target gesture operation, a multimedia object targeted by the two touch operations into a selected status;
  displaying, in response to the target gesture operation, at least one function option of a multimedia object targeted by the two touch operations; or
  displaying, in response to the target gesture operation, a management page of a multimedia object targeted by the two touch operations, wherein the management page at least includes an application management page, a notification management page, or a setting management page.

4. The method according to claim 1, further comprising:
  enabling, in response to the touch operation when no touch operation is detected in any display area other than the first display area within the target period, a second function that corresponds to the first touch operation.

5. An apparatus for responding to a gesture operation, the apparatus including a mobile terminal having a display screen that is in a folded status and has n display areas, where n is a positive integer of not less than 2, the apparatus comprising:
  a processor; and
  a memory configured to store an instruction executable by the processor, wherein
  the processor is configured to:
    determine, in response to a first touch operation detected in a first display area of the n display areas, whether a second touch operation is detected in a second display area of the n display areas within a target period, where the first display area and the second display area are different display areas;
    determine whether a target gesture operation is detected, in response to a second touch operation detected in the second display area within the target period, when touch positions of the two touch operations match each other; and
    enable a first function that corresponds to the target gesture operation, when the target gesture operation is detected,
  wherein in order to determine whether a target gesture operation is detected, the processor is configured to determine that the target gesture operation is detected, in response to the second touch operation being detected in the second display area within the target period, when a difference between the touch positions of two touch operations is within a target pixel range, and
  wherein, in the folded status, the first and second display areas are arranged in a stacked form with the two display areas facing in opposite directions, and a difference between the touch positions of the two touch operations indicates a distance between a touch position of the second touch operation and a projection of the first touch position onto the second display area.

6. The apparatus according to claim 5, wherein the target gesture operation is configured to simulate a double-click operation and the enabling the first function includes at least one of:
  returning, in response to the target gesture operation, to the top of a currently displayed App interface;
  lightening, in response to the target gesture operation, at least one of the n display areas;
  opening, in response to the target gesture operation, a multimedia object targeted by the two touch operations; or
  zooming, in response to the target gesture operation, a multimedia object targeted by the two touch operations.

7. The apparatus according to claim 5, wherein the target gesture operation is configured to simulate a press operation and the enabling the first function includes at least one of:
  setting, in response to the target gesture operation, a multimedia object targeted by the two touch operations into a selected status;
  displaying, in response to the target gesture operation, at least one function option of a multimedia object targeted by the two touch operations; or
  displaying, in response to the target gesture operation, a management page of a multimedia object targeted by the two touch operations, wherein the management page at least includes an application management page, a notification management page, or a setting management page.

8. The apparatus according to claim 5, wherein the processor is further configured to:
  enabling, in response to the touch operation and that no touch operation is detected in any display area other than the first display area within the target period, a second function that corresponds to the first touch operation.

9. A non-transitory storage medium, wherein a computer program instruction is stored in the storage medium and executed by a processor to implement a method for responding to a gesture operation applied to a mobile terminal including a display screen in a folded status having n display areas, where n is a positive integer of not less than 2, and the method comprising:
  determining, in response to a first touch operation detected in a first display area of the n display areas, whether a second touch operation is detected in a second display area of the n display areas within a target period, where the first display area and the second display area are different display areas;
  determining whether a target gesture operation is detected, in response to a second touch operation detected in the second display area within the target period, when touch positions of the two touch operations match each other; and
  enabling a first function that corresponds to the target gesture operation, when the target gesture operation is detected,
  wherein determining whether the target gesture operation is detected comprises determining, in response to that the second touch operation is detected in the second display area within the target period and when a difference between the touch positions of the two touch operations is within a target pixel range, that the target gesture operation is detected, and
  wherein, in the folded status, the first and second display areas are arranged in a stacked form with the two display areas facing in opposite directions, and a difference between the touch positions of the two touch operations indicates a distance between a touch position of the second touch operation and a projection of the first touch position onto the second display area.

10. The non-transitory storage medium according to claim 9, wherein the target gesture operation is configured to simulate a double-click operation and the enabling the first function includes at least one of:

returning, in response to the target gesture operation, to the top of a currently displayed App interface;

lightening, in response to the target gesture operation, at least one of the n display areas;

opening, in response to the target gesture operation, a multimedia object targeted by the two touch operations; or zooming, in response to the target gesture operation, a multimedia object targeted by the two touch operations.

11. The non-transitory storage medium according to claim 9, wherein the target gesture operation is configured to simulate a press operation and the enabling the first function includes at least one of:

setting, in response to the target gesture operation, a multimedia object targeted by the two touch operations into a selected status;

displaying, in response to the target gesture operation, at least one function option of a multimedia object targeted by the two touch operations; or displaying, in response to the target gesture operation, a management page of a multimedia object targeted by the two touch operations, wherein the management page at least includes an application management page, a notification management page, or a setting management page.

12. The non-transitory storage medium according to claim 9, the instruction is executed by a processor to further implement:

enabling, in response to the touch operation and that no touch operation is detected in any display area other than the first display area within the target period, a second function that corresponds to the first touch operation.

\* \* \* \* \*